United States Patent [19]

Pelly

[11] 4,393,654
[45] Jul. 19, 1983

[54] SHAPE MEMORY ELEMENT ENGINE

[76] Inventor: L. Ronald Pelly, Box 385, Fillmore, CA 93015

[21] Appl. No.: 275,101

[22] Filed: Jun. 18, 1981

Related U.S. Application Data

[63] Continuation-in-part of Ser. No. 56,429, Jul. 10, 1979, abandoned.

[51] Int. Cl.³ .............................................. F03G 7/06
[52] U.S. Cl. ........................................ 60/527; 60/529
[58] Field of Search .......................... 60/527, 528, 529

[56] References Cited

U.S. PATENT DOCUMENTS

| | | | |
|---|---|---|---|
| 3,613,732 | 10/1971 | Willson et al. ................. | 60/527 X |
| 3,937,019 | 2/1976 | Renner .............................. | 60/527 |
| 4,031,704 | 6/1977 | Moore et al. .................... | 60/527 X |
| 4,086,769 | 5/1978 | Smith ................................ | 60/527 |
| 4,197,709 | 4/1980 | Hochstein ........................ | 60/527 |

Primary Examiner—Allen M. Ostrager
Assistant Examiner—Stephen F. Husar

[57] ABSTRACT

An engine for conversion of low grade thermal energy into useful rotational energy incorporates a plurality of hollow deformable shape memory elements coupled in series with the crankpins of a crankshaft and with load limiting members. Hot and cold fluids are alternately directed through the crankshaft to the inner surface of the shape memory elements to provide rotation of the crankshaft.

5 Claims, 10 Drawing Figures

SHAPE MEMORY ELEMENT ENGINE

BACKGROUND OF THE INVENTION a. Field of the Invention

This is a continuation-in-part of Ser. No. 56,429 filed July 10, 1979 for Improved Shape Memeory Element Engine now abandoned.

This invention relates generally to the field of devices for conversion of low grade thermal energy to useful mechanical energy and, more specifically, to engines adapted for such conversion which incorporate shape memory elements.

b. Description of the Prior Art

This nation and, indeed, the majority of industrial nations, faces a major problem in conservation of energy, a problem commanding sharply increasing priorities as petroleum feedstocks become scarce and alternative energy sources such as nuclear power encounter political resistance or technological problems.

While high grade energy sources are in short supply, low grade energy sources, such as spent industrial cooling water, geothermal hot water, power plant waste heat, solar energy and oceanic thermal gradients, are abundant. Since by definition such low grade energy sources involve relatively low temperature differentials, Carnot efficiencies are low. As a result, exixting technology for utilization of such low grade energy sources is limited.

In the 1960's researchers began to recognize the potential of certain shape memory materials in the conversion of such low grade energy sources to useful mechanical power. Such shape memory materials exhibit a transition temperature or a narrow transition temperature range above and below which separate crystalline states apparently exist. Once annealed to a particular shape, these materials may be readily deformed while below the transition temperature. Upon subsequent reheating to above the transition temperature, the material returns to its original shape, exerting higher stress upon return that was required for low temperature deformation. The reversible cycle thus completed may potentially be used to do useful work.

While several alloys and bimetallic combinations are known to exhibit such shape memory characteristics, the most promising results to date have been produced with alloys containing near stoichiometric ratios of titanium and nickel. The advantages of such NiTi alloys, known commonly as 55-Nitinol, for low grade energy conversion systems stem primarily from an inherently narrow transition temperature range and secondarily from an ability to shift the transition temperature range up or down by minor composition changes. Many systems for utilizing 55-Nitinol have been proposed since its unique properties were disclosed, including systems using stretchable 55-Nitinol belts, asymmetric rotating wheels with 55-Nitinol spokes, and crankshafts driven by 55-Nitinol elements. These systems generally have however, failed to prove useful as a result of one or more inherent problems including low efficiencies, low power densities, low cycle speeds, complex fluid paths and sealing requirements and nonuniform heating and cooling of the shape memory elements.

For all their unique advantages, 55-Nitinol and other shape memory materials are not without limiting parameters. If subjected to a deformation of more than approximately 8% strain, 55-Nitinol is limited to less than 100% recovery of its original shape. However, the maximum work output of 55-Nitinol elements occurs at a strain level approaching such maximum value. In addition, the transition temperature or temperature range expands as the recovery tensile stress is increased (i.e., as load is increased during recovery to original shape). Thus, while it is necessary to operate a 55-Nitinol engine at or near maximum stress and strain in order to achieve high power density, both of these limiting factors dictate that each 55-Nitinol element be consistently controlled as to both temperature and load in order to avoid localized temperature variations which might result in overstressing or overstraining portions of an element, causing irreversible limitations upon the ability of the element to recover its original shape.

In addition, large surface areas of the shape memory elements must be exposed to the heating and cooling fluids in order to provide reasonable heat transfer rates and high cycle speeds while using low grade temperature sources. This requirement is further exacerbated by the need to provide sufficient length changes of the shape memory elements to achieve a reasonable power density.

Providing maximum heat transfer area, adequate separation of hot and cold fluids, and sufficient length changes of the shape memory elements while operating at or near maximum loading and maximum strain with consistent temperature control is a major problem which has not been adequately solved by the prior art.

SUMMARY OF THE INVENTION

The applicant proposes a device for conversion of low grade thermal energy into mechanical energy consisting of a plurality of hollow shape memory materials formed as helical coils or other spring shaped elements. The shape memory elements are rotatably connected to the crank pins of a crank shaft, the crankshaft incorporating at least one and preferably two passages therethrough adapted for transporting and directing heating or cooling fluids or both. The passages of the crankshaft further cooperate with the shape memory elements such that the heating and cooling fluids may be directed within the bores of the shape memory elements at predetermined intervals in the rotational cycle of the crankshaft. A low temperature strain is induced in the shape memory elements by the rotation of the crankshaft followed by high temperature stress induced by contact with the hot fluid. Rotation of the crankshaft may thus be sustained and useful work produced. Each shape memory element further cooperates serially with load limiting means, preferably consisting of spring means, piston means, or a movable weight.

By utilizing hollow tubes of shape memory material, coupled with fluid injection from the crankshaft end, the applicant succeeds in providing maximum heat surfaces for the shape memory elements while providing even temperature control across the length of the individual elements. Load control is effectively accomplished by providing load limiting means in series with each element.

BRIEF DESCRIPTION OF THE DRAWINGS

The invention will be more fully appreciated from the following detailed descriptions of the preferred embodiment thereof taken in conjunction with the appended drawings wherein.

DETAILED DESCRIPTION OF THE DRAWINGS

Figure 1:
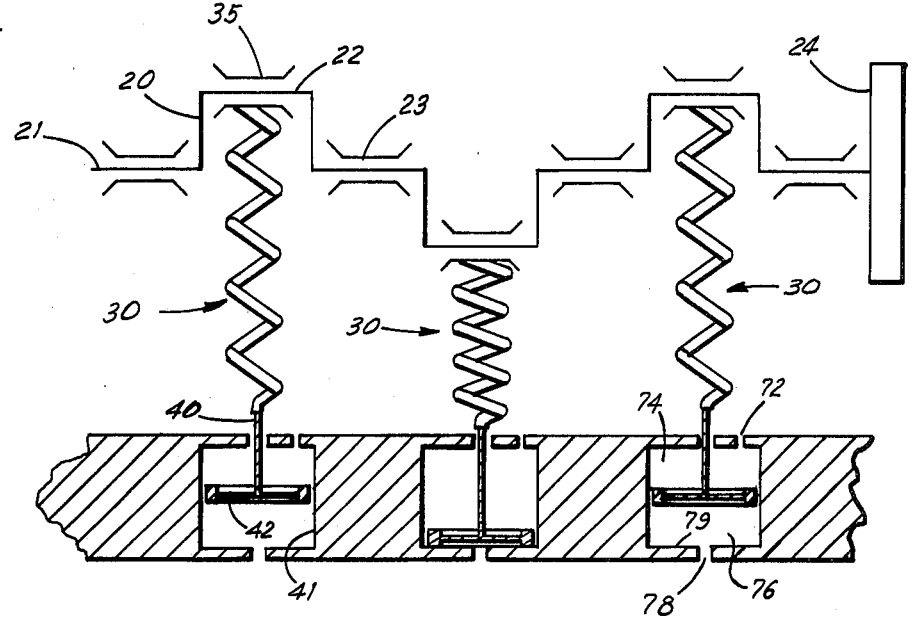
FIG. 1 is a schematic elevational view showing an engine embodying the load limiting principles of this invention.

As shown in FIG. 1, the shape memory element engine of this invention incorporates at least one and preferably a plurality of shape memory elements 30, preferably constructed of 55-Nitinol having a transition temperature range chosen to respond to the maximum and minimum temperatures of the low grade thermal energy source to be utilized. The shape memory elements 30 are further preferably annealed to a tubular helix configuration as shown in FIG. 1 and more clearly in FIG. 2. The helix configuration is chosen to provide nominal strain of the shape memory material while allowing reasonable total flexure of the element 30 as a unit. The tubular configuration is chosen to provide maximum heat transfer area and to simplify fluid flow and hot and cold fluid separation problems.

One end of each shape memory element 30 incorporates a bearing 35 rotatably surrounding and cooperating with a crankpin 22. The other end of each element 30 is connected in series to a load limiting member 40. As shown in FIG. 1, the load limiting member 40 may incorporate a piston 42 sealably engaging a cylinder 41, the function and operation of which will be more fully considered in conjunction with the discussion of FIGS. 6 and 7.

As shown schematically in FIG. 1, the shape memory elements 30 cooperate with a crankshaft 20 such that expansion and contraction of the shape memory elements 30 may cause rotation of the crankshaft journals 21 within the main bearings 23 producing useful mechanical output. A flywheel 24 provides inertial dampening utilizing well known principles. While a plurality of shape memory elements is preferred, the flywheel 24 allows for cooperation with only a single element.

Figure 2:
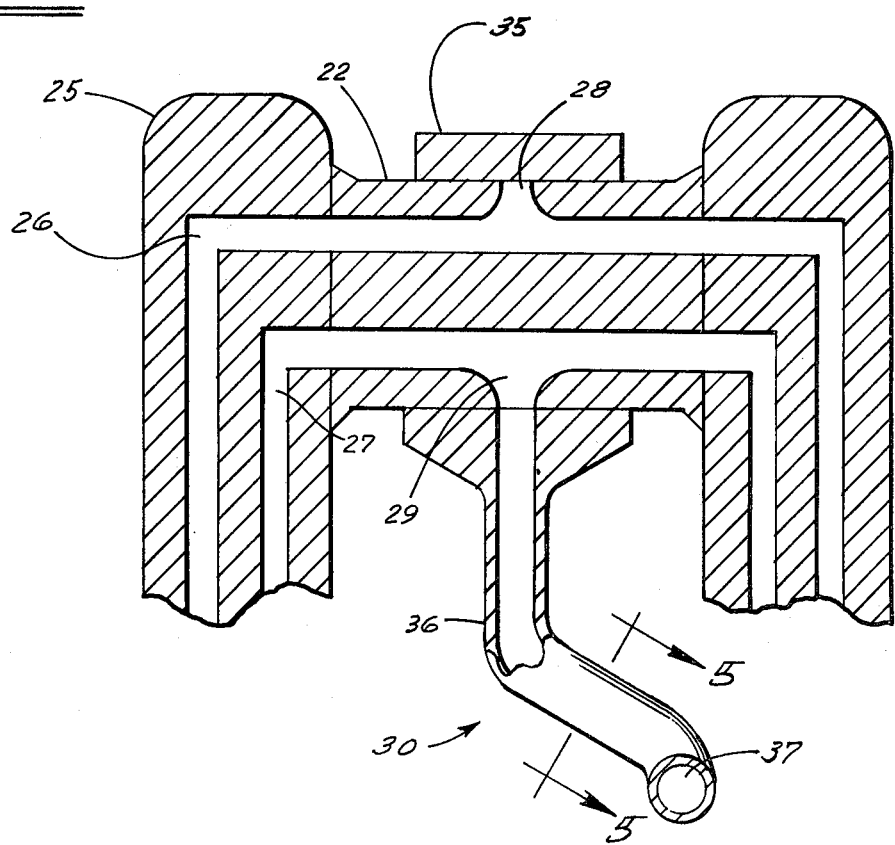
FIG. 2 is an exploded sectional view of a crankpin and cooperating hollow shape memory element.

Now referring to FIG. 2, the web 25 and the crankpin 22 of the crankshaft 20 may be seen to surround two fluid passages 26 and 27 adapted for transporting cold and hot fluids, respectively. Each fluid passage 26 and 27 preferably runs continuously throughout or along the entire length of the crankshaft 20 and is preferably maintained under positive pressure. Each passage 26 and 27 incorporates a branch 28 and 29, respectively, to the surface of the crankpin 22 at opposed sides thereof such that hot fluid from one passage 27 may be injected into the bore 37 of a shape memory element 30 at approximately the top of the crankpin 22 rotation as shown, and cold fluid, from the other passage 26, may be injected into the bore 37 of the shape memory element at approximately the bottom of the crankpin's 22 travel. After injection, the fluids may, if desired, be collected and used to operate other shape memory elements having different transition temperatures. Alternately, the previously used fluids may be injected through additional passageways in the crankshaft 20 in order to pre heat or pre cool the shape memory elements, thereby more fully utilizing the thermal energy of the spent fluids. In order to reduce the thermal losses between the hot and cold fluids, the passageways 26 and 27 would generally be insulated.

The shape memory elements 30 shown in FIG. 1 are connected to the crankshaft 20 in an inline arrangement. However, to maximize the energy density of the engine, a plurality of shape memory elements 30 would generally be connected radially to each bearing 35. That is, the configuration at each crankpin 22 would resemble the spokes of a wagon wheel except that the spokes would be coiled shape memory element helical springs. As the entrance or bore 37 of each shape memory element 30 passes over each opening 28 and 29 in the crankpin 22, hot or cold fluids are injected into the interior of said elements 30. Effectively, the crankshaft 20 functions as a valve to meter the flow of the hot and cold fluids to the bore 37 of the elements 30 without the mechanical complexity of providing typical fluid valves, such as solenoid valves, at each entrance of each said shape memory elements. However, where only one coiled shape memory element is used to preform work, a mechanical fluid valve may be used effectively.

Figure 3:
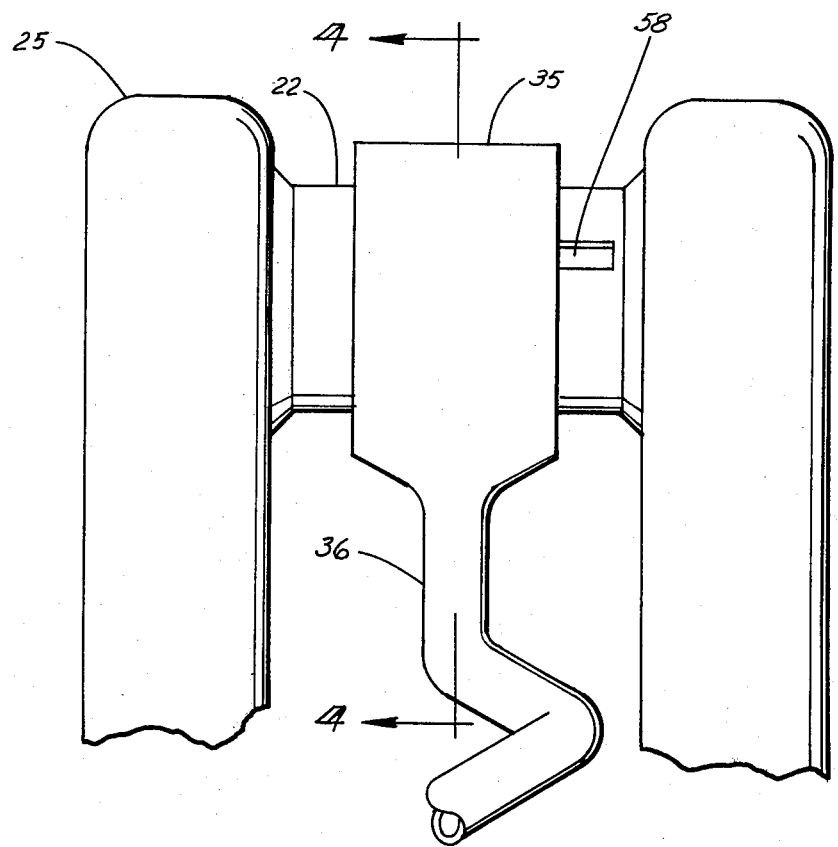
FIG. 3 is an elevation view of the crankpin and shape memory element of FIG. 2.
Figure 4:
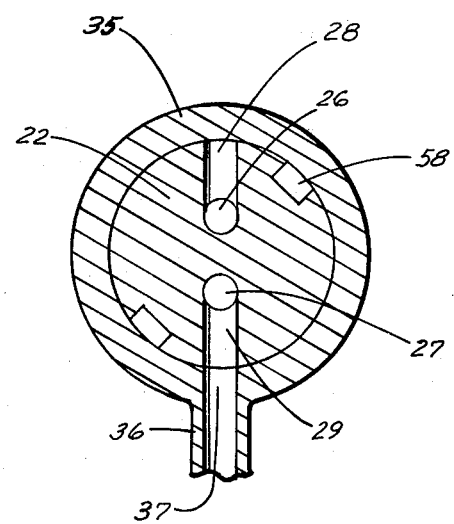
FIG. 4 is a cross-sectional view along line 4—4 of FIG. 3.

As shown in FIGS. 3 and 4, slots 58 may be cut axially into the surface of the crankpin 22 between the fluid ports. The slots 58 allow the bore 37 of the shape memory element 30 to be exposed, following hot or cold fluid injection, to the surrounding atmosphere, thereby allowing ambient or pressurized air to replace the fluid which may thus be drained or forced from the element 30. This feature minimizes instantaneous temperature gradients across the length of the shape memory element 30 which might otherwise encourage overstress or overstrain. The function of the slots 58 may be explained by the following example. If a thin elongated vertical tube is filled with water and a thumb is placed firmly over the top exit, the water will not flow out the lower exit. However, if the thumb is lifted, the water will then start flowing downward, but if the thumb is rapidly replaced, the water will stop flowing in the tube due to a vacuum pressure being induced behind the water. Similarily, when hot or cold fluids are injected through the shape memory element 30, said fluid motion will come to a halt when the fluid injection is stopped unless air is allowed to follow the injected fluid, usually hot or cold water. Because it is desirable to have the hot fluid to pass through the entire tube 30 length before the cold fluid is injected (or vice verse) in order to maximize the energy extraction within said fluids, means of allowing air to follow said fluids is therefore preferred.

In order for the injected liquids to flow through the tubing 30 without stopping, the slots 58 should be located on the crankpin 22 immediately behind (rotationally) the opening 28 and 29 in said crankpin. This allows the air to flow through the slots 58 and into the bore 37 immediately after the hot or cold fluid is injected. An alternate means of providing air or other gaseous fluid injection following the hot and cold liquid fluid injection would be to use additional passageways in the crankshaft 20 to carry the air or pressurized air. Another alternate means of providing pressurized air to the bore 37 would be to enclose the instant invention, except for the tube 30 exit, within a container and then pressurize said container. Therefore pressurized air would be available to enter the slot 58 and will then push the hot and cold fluid through the shape memory element tubing 30.

Figure 5:
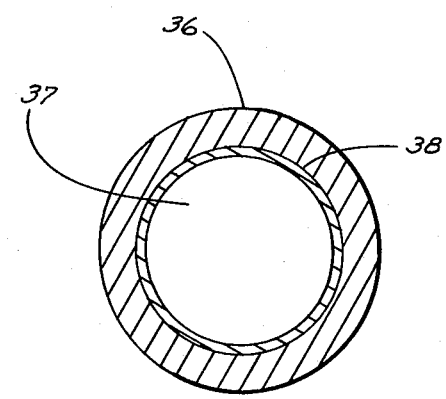
FIG. 5 is a cross-sectional view along line 5—5 of FIG. 2.

Now referring to FIG. 5, a refinement may be shown which discourages instantaneous temperature gradients. A cross-section of a shape memory element 30 may be seen to include a coating 38 of a high heat conductor material interposed between the bore 37 and the wall 36 of the element 30 such that during fluid injection, fluid distribution problems will be discouraged from causing localized temperature variations within the shape memory element 30. A variety of additional or alternative methods may be employed to minimize fluid distribution problems and maximize heat transfer rates such as increasing the roughness of the inner tubular surface, and introducing the hot and cold fluids with a swirling motion such as by the use of vanes at the entrance to the shape memory elements.

Figure 6:
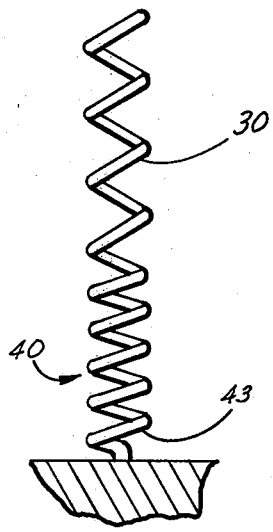
FIG. 6 is a shape memory element coupled with spring type load limiting means.
Figure 7:
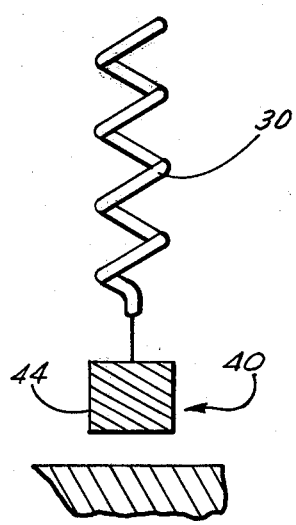
FIG. 7 is a shape memory element coupled with gravity-type load limiting means.

Now referring to FIGS. 1, 6, and 7, the operation of the load limiting member 40 may be shown. In FIGS. 1, 6, and 7 the load limiting member 40 is thus coupled in series with the respective shape memory element 30. The load limiting member 40 shown in FIG. 1 incorporates means for providing a pressure differential across the piston 42. A maxinum stress may thus be provided for each shape memory element 30, additional stress above the maximum being avoided by displacement of the piston 42. The piston volume 74 on the side nearest the shape memory element 30 is pressurized generally with a gaseous fluid through the opening 72. A gaseous fluid is preferred as it has low mass and may be readily moved in and out of the volume 74 due to translation of the piston 42. The volume 76 on the opposite side of the piston 42 is vented to the atmosphere through the opening 78. During the cold fluid injection phase or low stress capability phase of the shape memory element 30, the piston 42 will generally rest against the piston wall 79, and then lift off from the wall 79 during the high stress or high temperature phase. The pressure difference between the volumes 74 and 76 will then limit the maximum loading on the shape memory element 30. By allowing the gaseous fluid to move in and out of the volume 74 through the opening 72, nearly constant loading will occur on the shape memory element 30 when said element is above its transition temperature. This approximate constant loading on the element 30 during the high element 30 temperature and high stress phase will then result in maximizing the energy output of said elements. Generally the opening 72 from each of the piston load limiters 40 would be connected to a common pressure vessel, not shown. Alternate to having an opening 72, the volume 74 may be made adequately large such that the volume change due to piston 42 translation and therefore the pressure change within said volume 74 is sufficiently small such that the shape memory element 30 load limit is not exceeded.

The usefulness for a load limiter occurs due to the desire to prevent the over stressing of the shape memory elements, while at the same time maximizing the energy output of said element. The possibility of over stressing the shape memory elements occurs due to the large difference in the stress-strain characteristics of said elements when in the hot and cold phases. When cold, the elements can be safely strained about 3 to 8 percent of its length. However when hot, the element strain limit is less than one percent.

Therefore, if the cold element 30 in FIG. 1 is stretched out at the top of the crankshaft cycle and then the element 30 is exposed to a hot fluid while at the same time said element is restrained at its outboard attachment, the hot element 30 will be strained beyond its capability and will either break or yield.

Now to further describe the engine cycle shown in FIG. 1. Initially the piston 42 rests against the wall 79 with the element 30 in a cold state and the crankpin 22 is nearest the load limiter 40. As the crankshaft 20 rotates, the cold element 30 is stretched out while the piston 42 remains against the wall 79. At the top of the cycle, the element 30 is injected with a hot fluid and the piston lifts off from the wall 79. The piston 42 translation prevent the over stressing of the element 30. As the crankpin 22 continues its rotation from the top of the cycle to near the bottom of the cycle, the piston 42 and element 30 moves towards the wall 79. Near the bottom of the cycle, the element is injected or exposed to the cold fluid. If the piston 42 is not already in recontact with the wall 79, then the pressure differential across the piston 42 will cause a small translation such that piston recontact with said wall will occur. To prevent the hard contact between the piston 42 and the wall 79, a shock absorber, not shown, may be used.

Note that the wall 79 will prevent over straining the element 30 by limiting the outward translation of the piston 42. The crankpin 22 offset is selected such that the element strain is maintained within the 3 to 8 element limit during the stretching when the element 30 is in its cold phase. Also note that to allow the hot and cold fluids to flow completely through the element 30, an appropriate hole may be required in the piston, or alternately, an opening may be provided near where the element attaches to the load limiter. A further note is that since the element may creep with time, the piston position should be adjustable.

The spring 43 shown in FIG. 6 and the weight shown in FIG. 7 provide similar, alternative methods of constructing load limiting members 40, the spring 43 and the weight 44 each providing design simplicity but possibly sacrificing functional flexibility or efficiency.

As previously noted, both the hot and cold fluids are preferably injected through the interior 37 of the tubular element 30. However, the element 30 may also be heated or cooled externally. For example, if a hot fluid is injected internally, the tubular surface may then be cooled externally if the external air temperature is below the element transition temperature provided the engine rotation is sufficiently low so as to allow adequate time for said element to reject its thermal energy to the external atmosphere. Since the heat transfer coefficient of air is relatively small, an external fan may be used to increase the external heat transfer coefficient, said fan preferably rotating with the crankshaft.

Figure 10:
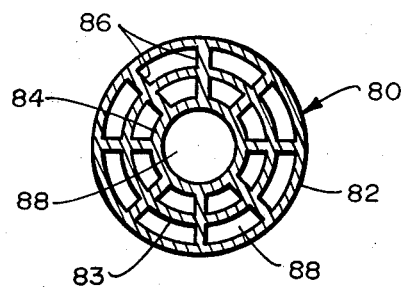
FIG. 10 is a cross-section view across the shape memory element with a plurality of longitudinal passageways.

A cross-section of a tubular shape memory element 80 configuration with a plurality of longitudinal internal passageways is shown in FIG. 10. The tube 80 includes an outer shape memory element ring 82, inner shape memory element rings 83 and 84, shape memory element webbing 84 or fins, and fluid passageways 88. Hot and cold fluids are injected through the fluid passageways 88. This configuration with two or more shape memory element rings include several advantages such as (1) significant increase in the shape memory element material per unit tube cross-sectional area and therefore greater power output from the engine, (2) greater internal heat transfer coefficient, (3) significant increase in tube stiffness thereby reducing any tendency for the tube to buckle, and (4) more even fluid distribution within the coiled tube. The fluid injection may be through all of the passageways 88 or only through the annulus between the rings. The tubing 80 may be constructed as a single piece of tubing, as shown, or using multiple rings with fins, said rings being slipped over each other. A similar product using copper or stainless steel is manufactured by Noranda Metal Industries, Inc. of Newtown, Conn.

Figure 8:
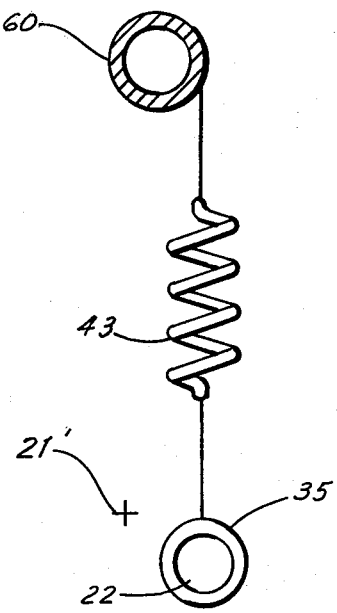
FIG. 8 is a plan view of an engine utilizing a torsional shape memory element; and, FIG. 9 is an elevation view similar to FIG. 8.
Figure 9:
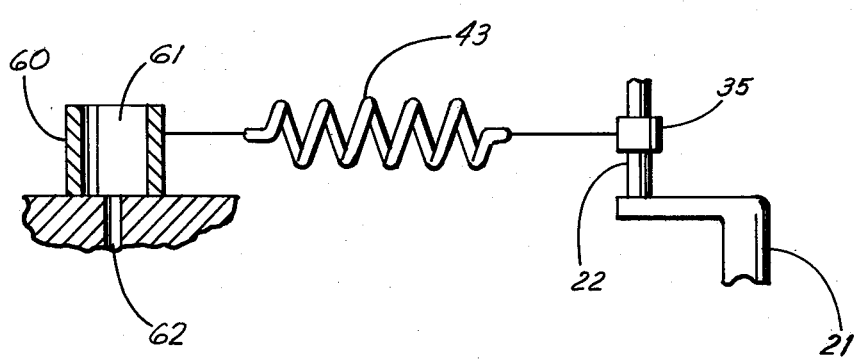

Referring now to FIGS. 8 and 9, an alternate embodiment may be seen wherein the helical coil shape memory elements described previously are replaced by a hollow torsional shape memory element 60. The hollow torsional element 60 is connected in series with a spring-type load limiting member 43, in turn connected to a bearing 35 rotatably engaging a crankpin 22. The rotational center of a crankshaft 20 is shown by a journal 21 in FIG. 9 and a center mark 21' in FIG. 8.

The principle of operation of the hollow torsional shape memory element 60 is similar to that previously discussed. Cold fluid is injected into an inner bore 61 through a fluid passage 62 prior to the torsional element 60 being strained by rotation of the crankshaft 20. Upon reaching maximum rotation and, consequently, maximum strain, the hot fluid is injected into the bore 61 of the torsional element 60, urging it to return to its original shape while causing it to exert a force, translatable into useful work, on the rotating crankshaft 20, While only hollow helical coil and hollow torsional elements are illustrated, a variety of other spring configurations may be utilized such as hollow plate springs, hollow leaf springs and hollow spiral springs, with power strokes in either the compression or tension portion of the applicable cycle.

Now referring to the coiled element 30 shown in FIG. 1. When the hot fluid is injected into the bore 37 of the element 30, the portion of the element closest to the crankshaft will be heated before the element material near the load limiter 40. This is due to the finite time for the fluid to traverse through the element 30. This will cause the element coils nearest the crankshaft to contract before the downstream coils and can result in these downstream coils being over-strained before they can be heated.

One means of preventing this over-straining is to use a tubular, flexible shroud into which the coiled element 30 is imbeded. The shroud thereby allows the contraction of the element 30 coils while limiting the expansion of the coils. That is, the shroud interconnects the element coils thereby limiting the maximum strain on the said coils.

While the above description contains many specificities, these should not be construed as limitation on the scope of the invention, but rather as an exemplification of one preferred embodiment thereof. Many other variations are possible, for example springs may be placed within the piston 42 chamber or flow restrictors may be placed in the orficies 72 and 78 in order to modify the stress-strain characteristics of the piston load limiter. Another variation is to use the piston 42 to pump a fluid. Accordingly, the scope of the invention should be determined not by the embodiment illustrated, but by the appended claims and their legal equivalents.

What is claimed is:
1. A mechanism for transforming heat energy into mechanical energy comprising:
   a. a plurality of deformable shape memory elements having inner surfaces and responsive to form changes at a predetermined transition temperature;
   b. a hot fluid incorporating a temperature above said transition temperature of said shape memory elements;
   c. a cold fluid incorporating a temperature below said transition temperature of said shape memory elements; and
   d. a crankshaft including at least one offset crankpin rotatably connected to one end of said shape memory elements, said crankpin incorporating fluid passageways for transporting, respectively, hot and cold fluids, said fluid passages sequentially and sealably cooperating with said inner surfaces of said shape memory elements whereby said cold fluid may contact said shape memory elements prior to deformation and said hot fluid may contact said shape memory elements prior to recovery.

2. The device of claim 1 wherein a load limiting means is connected, respectively, to one end of each said deformable shape memory element.

3. The device of claim 1 wherein the deformable shape memory elements incorporate a tubular helical coil configuration.

4. A mechanism for transforming heat energy into mechanical energy comprising:
   a. one or more tubular deformable shape memory elements responsive to form change at a predetermined transition temperature;
   b. means for sequentially directing heating and cooling fluids to the inner surfaces of the shape memory element;
   c. means for allowing a gaseous fluid to sequentially follow each of the hot and cold fluids through said shape memory elements; and
   d. means attached to each element for deforming said element and for receiving and utilizing the energy output of each said element as it transfers through said transition temperature.

5. A mechanism for transforming heat energy into mechanical energy comprising:
   one or more deformable shape memory elements responsive to form change at a predetermined transition temperature;
   means for sequentially directing hot and cold fluids to the surfaces of said shape memory elements;
   load limiting means which are connected in series to each said shape memory elements, said load limiting means further comprising a piston connected to said shape memory element, a housing for said piston, a gaseous fluid within said housing and said gaseous fluid used for providing a pressure differential across said piston, said piston rest against a wall of said housing during a portion of the thermal cycling of said shape memory elements, and said piston translating within said housing during the heating phase of said shape memory elements whereby overstressing of said shape memory elements may be avoided; and
   means attached to said shape memory elements for deforming said shape memory elements and for receiving and utilizating the energy output of said shape memory elements.

* * * * *